United States Patent [19]

McVay

[11] Patent Number: 5,619,569

[45] Date of Patent: Apr. 8, 1997

[54] COIL CORD SNARL PREVENTING DEVICE AND METHOD

[76] Inventor: Clifford R. McVay, P.O. Box 1393, Casper, Wyo. 82602-1393

[21] Appl. No.: 453,153

[22] Filed: May 19, 1995

[51] Int. Cl.⁶ .................................................. H04M 1/00
[52] U.S. Cl. ............................................ 379/438; 379/437
[58] Field of Search ........................... 379/438, 437, 379/451, 447, 452, 439; 439/501; 40/660, 661, 306, 316, 317; 174/65 R, 91, 93, 135, 136

[56] References Cited

U.S. PATENT DOCUMENTS

| | | | |
|---|---|---|---|
| 2,768,457 | 10/1956 | Biek | 40/660 |
| 2,946,839 | 7/1960 | Horing | 174/93 |
| 3,068,316 | 12/1962 | Witt | 439/501 |
| 3,373,954 | 3/1968 | Hilsinger, Jr. | 379/438 |
| 4,486,628 | 12/1984 | Thompson | 379/452 |
| 4,939,778 | 7/1990 | Tomberlin | 379/438 |

*Primary Examiner*—James L. Dwyer
*Assistant Examiner*—Jack Chiang

[57] ABSTRACT

A coil cord snarl preventing device comprising, in part, a substantially circular hollow body and an operably joined coil cord fastening member (composed of a somewhat flexible, resilient material such as a low density plastic polyethylene plastic) having an opening through which one end of a retractable coil cord item is slidably inserted thence traversing the entire length of the hollow body, interiorly, and exiting an outlet end thus mostly eliminating tangling conditions commonly associated with coil cord products, thereby preventing a dropping and damaging of telephone base and handset products because of snarled coil cords. The device also enjoys strong advertising or promotional capabilities because of its mountable proximity to the vast number of telephonic units in use universally.

16 Claims, 5 Drawing Sheets

COIL CORD SNARL PREVENTING DEVICE AND METHOD

BACKGROUND OF THE INVENTION

1. Field of the Invention

The present invention relates generally to a device for use in the preventing or at least a considerable lessening of snarling conditions common to coil type cords. In one of its more specific embodiments, the invention relates to a device for use in preventing a snarling of telephone handset coil cords.

2. Description of the Prior Art

Over a considerable period of time, telephone systems' spiraled type cords, described commonly as telephone coil cords or retractable telephone handset coil cords, have been provided for a convenient and easy extension of telephone handsets from corresponding telephone base units. Even though these handset coil cords do provide useful and convenient extension capabilities, there exists, however, a major negative result in their utilization. That being the propensity for coil cord items to somewhat twist onto themselves thereby resulting in a snarling or entangling condition which can be quite bothersome and annoying including oftentimes a dropping and damaging of the base unit or the handset unit because of a tangled coil cord.

Even though certain products, which might be described broadly as swiveling type articles, have been introduced in recent years allowing theoretically for a free turning or rotating of telephone handset units (to which the swiveling items are detachably connectable) in relationship to their attachment with telephone base units via coil cords, those particular items, although supposedly suited for their intended usage, do not comprise encompassing features, as does the present invention, described following, for maximum convenience and purposefulness; including having prodigious advertising potential incorporated with the present invention as well as other beneficial features, thereby greatly increasing utilitarian characteristics of telephone systems and particular accessories thereof.

SUMMARY OF THE INVENTION

The general purpose of the present invention, which will be described subsequently in greater detail, is to provide a new and improved coil cord snarl preventing device having features which enable versatility and ease of use, as well as promotability, when utilized in conjunction with a coil type cord and more specifically a telephone handset coil cord.

To achieve this and as illustrated in representative drawings following, and as depicted in one particular embodiment of the invention, a one piece, hollow tubular article is utilized having a coil cord fastening member permanently connected to the hollow tubular article at one end thereof; the cord fastening member having an opening therein and utilized for accessing the hollow tubular article's interior. In operation, one end of a coil cord is fed through the opening in the fastening member and is further easily pushed or urged entirely through the hollow tubular article thence exiting the opposite end of the fastening member end of the hollow tubular article a propitious distance. Incidentally and in actuality, the hollow article would not necessarily have to be constructed tubularly, or similarly cylindrically shaped; e.g., possibly being formed somewhat squared in shape, or other configuration. Additionally, the cord item may be pulled to a desired position or location while enclosed within the hollow tubular article after one end of the cord item has exited or is about to exit (by inserting, for example, one's index finger into the tubular article's exiting end and grasping the cord end) the tubular article.

Further, because the opening (openings utilized in coil cord fastening members are capable of comprising a multiplicity of patterns or configurations) in the cord fastening member can be constructed being a substantially slitted aperture, incised or formed into a substantially flexible, resilient material composing the fastening member, a coil cord item is firmly yet slidably attached to the fastening member, after being introduced through that member, thus stopping the snarl preventing device from slipping uncontrollably downward (for example, should a wall mounted telephone system be utilized) on the coil cord. Or likewise, from sliding uncontrollably back and forth on any particular coil cord onto which the device is installed. Also, the cord item is still allowed to function, as was intended by its construction, in a stretching and retracting manner within the hollow tubular article since the hollow article would be manufactured providing for an adequate inside dimension, or diameter, to allow such actions.

In the event of a necessity for the coil cord item to be introduced into the hollow tubular article other than as described above with the coil cord item fed initially through the coil cord fastening member, a detachable cord fastening member may be incorporated with the invention so that one of two ends of the cord item may be inserted into and manually urged entirely through the hollow tubular article with the fastening member removed from the tubular article. Specifying telephone handset coil cords, modular connector plugs are permanently affixed to the cord ends for detachable connection to telephone base units- wall mounted or other. Accordingly, one plug fitted end of the coil cord could be fed through the entire length of the hollow tubular article followed by an insertion of the opposite plug fitted end of the coil cord through the opening in a detached fastening member (or, vice versa) from that member's underside and previous to a reattachment, by threaded means or otherwise, of the coil cord fastening member with the hollow tubular article.

Further, with the coil cord ends each protruding an adequate distance from the reattached fastening member at one end of the hollow tubular article and protruding also an adequate distance from the opposite end of the hollow article, respectively, the coil cord with plug fitted ends can then be grasped by hand and pulled, with a minimum of effort, either direction through the hollow tubular article to an advantageous location, thus bringing the snarl preventing device into a proper relationship (arranged surrounding a desired section of the coil cord) with the cord for optimum snarl preventing results.

Additionally, other articles may be included with the invention comprising, in part, telescopically insertable items which will allow for an extension of the snarl preventing device for accommodating coil type cords of greater length than most commonly utilized (and, for extremely lengthy telephone handset coil cords, an adequately flexible, resilient material would most likely be utilized in manufacturing the hollow tubular -or other shape- article) with telephone base units.

Also, a clear, see-through (transparent) type cylindrical tube (if a cylindrically shaped hollow article is utilized) can be provided with the invention for being slid onto the hollow tubular article and protecting a telephone numbers type list which can be incorporated with the invention for installation onto the tubular article's exterior. Or each cylindrical tube, itself, could comprise a logo(s) and/or a telephone number(s) for advertising purposes, as examples. Also, logos, etc., could naturally be affixed or imprinted directly onto the hollow tubular member's exterior surface.

And the coil cord fastening member heretofore described can be designed utilizing various sizes and shapes, including but not limited to circular, and various methods of detachable attachment (if not permanently affixed) of the fastening member to the heretofore described tubular article, including threaded means, however not limited to such, may be utilized.

There have thus been outlined, somewhat broadly, the more significant features of the invention in order that the detailed description of the device following may be better understood, and in order that the present contribution to the art may be realized. And as mentioned, other features of the invention will be described hereinafter and are intended to be included in claimed material appended hereto. In this respect, before explaining at least one embodiment of the invention in detail, it is desired that the invention not be limited in its application to the details of construction and to the arrangements of the components set forth in the following description or as illustrated in the drawings; nor limited to any exact arrangement of steps per the appended method claim. As heretofore mentioned, the invention is capable of other embodiments, and of being practiced and carried out in a variety of ways.

For example, the invention could theoretically function, somewhat, by eliminating the cord fastening member altogether and simply incorporating a modified version of the hollow tubular member (possibly utilizing a smaller diameter than anticipated ordinarily) to enclose at least a section of a coil cord item. However, the stretching and retracting feature of coil cords most likely would be inhibited without the use of a larger diametral hollow tubular article (if utilizing a tubular shape in its construction) having an attached cord fastening member. And such incorporation of a hollow article without utilizing an attached fastening member is to be considered inclusive of, or comprised by, the appended claims since a cord item would inherently be fastened to the hollow article by being enclosed within that article.

Further, it is to be understood that the phraseology and terminology employed herein are for purposes of description and should not be regarded as limiting. Accordingly, those skilled in the art will appreciate that the conception upon which this disclosure is based may readily be utilized as a basis for the designing of other structures [as described, for instance, and possibly similar to the above example(s)], methods and systems for carrying out the several objectives of the present invention. It is of importance, therefore, that the appended claims be regarded as including such equivalent constructions, or fabrications, insofar as they do not depart from the spirit and scope of the invention.

And the purpose of the foregoing abstract is to enable the United States Patent and Trademark Office and the general public, including the engineers and practitioners in the art who are not familiar with patent or legal terms, or phraseology, to readily determine from a cursory examination the nature and essence of the technical disclosure of the application. Accordingly, the abstract of the present invention is neither intended to define the invention of the application, which is desired to be determined by the stated claims appended hereto and their legal equivalents, nor is it meant to be limiting as to the scope of the invention in any manner.

Having delineated the foregoing, it is therefore an object of the present invention to provide a novel and improved snarl preventing device for attachment to telephone handset coil cords, or similarly functioning articles of manufacture.

It is a further object to provide a cost efficient snarl preventing device so that the device may be more affordably acquired by the buying public, generally, for use with their telephone systems.

It is another object to provide a snarl preventing unit which may be easily manufactured and marketed for both personal and business purposes.

It is yet another object to provide components and various accessories, to include, in part, a listing sheet for itemizing names and telephone numbers, as well as including a complementary transparent, slip-on type tube which may be utilized with the snarl preventing unit for enhancing the convenience and versatility features of the unit.

It is yet another object to provide promotional capabilities for the snarl preventing devices because of their mounted proximity to telephone base units when ordering, by telephone, as an example, pizza or other fast food products for human consumption.

Still other objects and advantages of the invention will become apparent to those skilled as well as enlightening others having an interest in the art upon reference to the following detailed description and the accompanying drawings, as follows.

DESCRIPTION OF THE PREFERRED EMBODIMENTS

Figure 1:
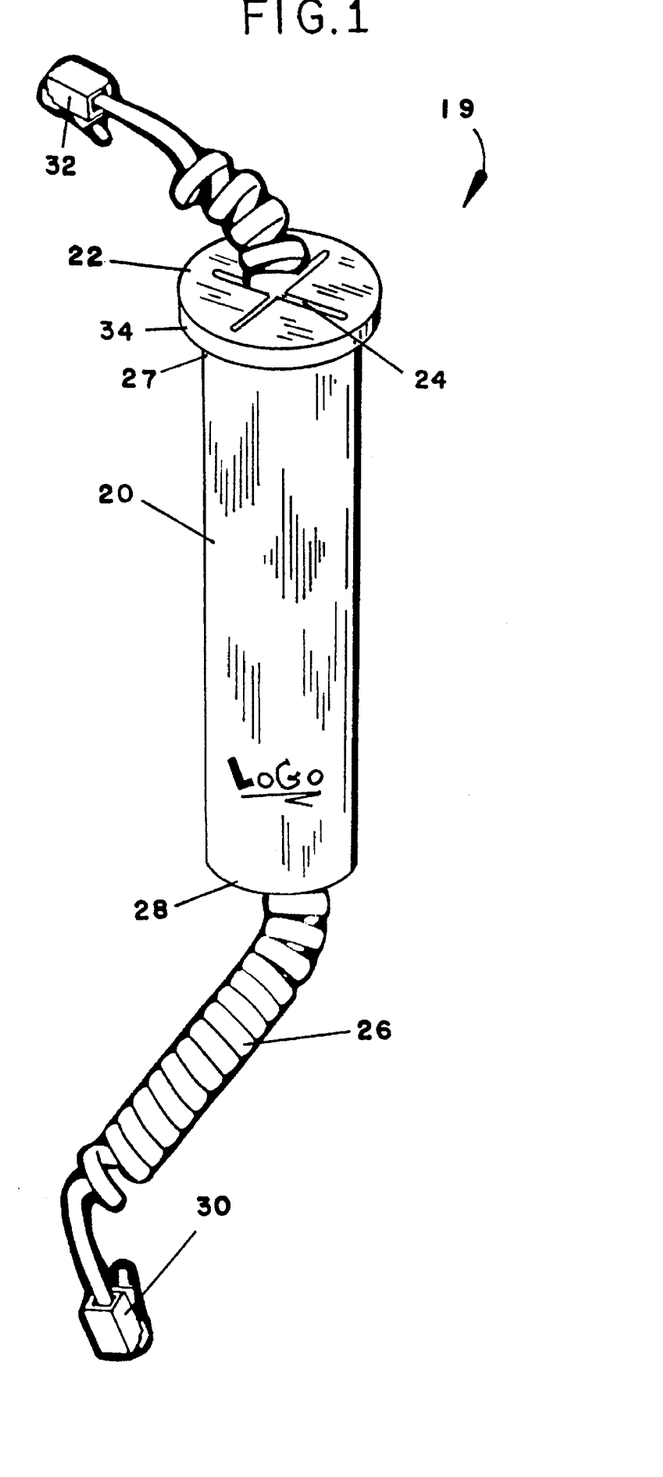
FIG. 1 is a perspective view illustrating the device of the invention in place enclosingly arranged on a section of a telephone handset coil cord.

Referring now to FIG. 1 of the accompanying drawings which are intended to delineate the invention in greater detail and in which like numerals designate like features, the device 19 of the invention includes a generally circular shaped hollow body 20 having a coil cord fastening member 22 affixed to its upper body portion (or inlet end) 27. The cord fastening member 22 having a slitted or similarly slotted opening 24 incised or formed in a somewhat "X" or "+" pattern therein through which one (first end) of two ends of a telephone handset coil cord 26 has been inserted thence exiting the outlet end 28 of the hollow body 20 of the invention. For purposes of these illustrations (although each modular plug is identical), the first modular connector plug fitted end of the handset cord 26 will be denoted as drawing reference numeral 30, and the second modular connector plug fitted end of the handset cord 26 will be denoted as drawing reference numeral 32. As can be readily determined, coil cord 26 can be manipulated to a desired location therein hollow body 20 by simply grasping and pulling either end of cord 26 thereby slidingly adjusting the cord to a desired location. As the cord fastening member 22 can be manufactured utilizing a somewhat flexible material, such as a low density polyethylene plastic, cord 26 can be slidingly manipulated through opening 24 without damaging cord 26 and still keep the coil cord item from slipping uncontrollably back and forth within hollow body 20. Also seen in FIG. 1 is a protruding circular portion 34 of the coil cord fastening item 22 which is additionally utilized to assist in keeping particular sections of cord 26 separated thus inhibiting those sections from becoming entangled by twisting onto themselves which is a most common occurrence with coil cord products, as described previously.

Figures 2, 3, 4:
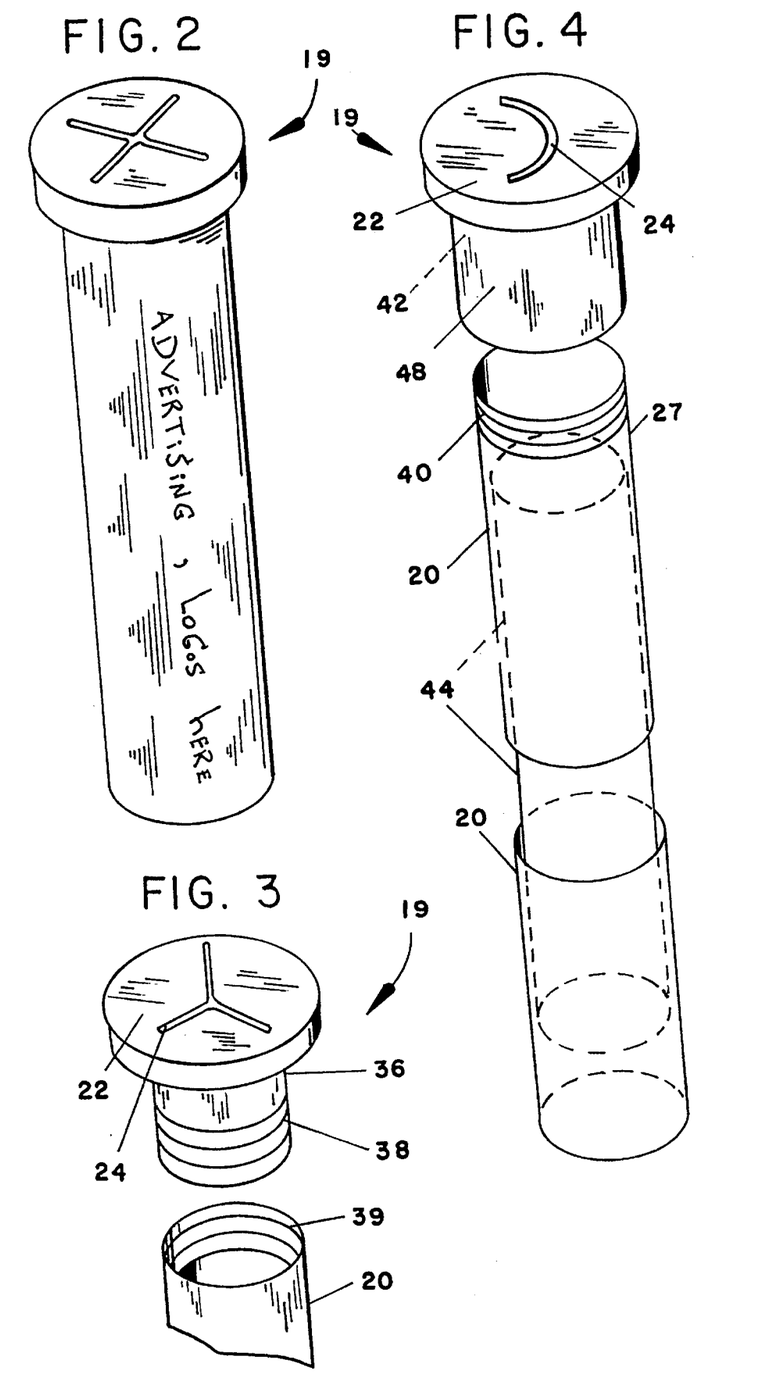
FIG. 2 is a perspective view of the device of the invention illustrating, in part, promotional capabilities.
FIG. 3 is a perspective view illustrating a plug type coil cord fastening item removable from the hollow body portion of the invention by a threaded method.
FIG. 4 is a perspective view illustrating a cap type coil cord fastening item removable from the hollow body portion of the snarl preventing device by yet another threaded method, as well as showing a telescopic item which could be incorporated with the invention having a segmented hollow body portion in this view.

As seen in FIG. 2, device 19 of the invention is shown being mostly identical to that item illustrated in FIG. 1, and demonstrating here the capabilities, in part, for the invention to employ promotional displays.

Viewing FIG. 3, device 19 is seen with its entirely removable coil cord fastening member 22 having a somewhat slotted opening 24 formed in a somewhat "Y" pattern. Also, the cord fastening member 22 is comprised of a plug type portion 36 having male threading 38 formed thereon which is compatible with female threading 39 formed within the hollow body 20, as shown.

As depicted in FIG. 4, device 19 utilizes male threading 40 formed on upper portion 27 of the hollow body.20, and is compatible with female threading 42 (however, not shown) formed within the removable cap type article 48 comprising the coil cord fastening member 22. Also viewed is another variation, being formed in a somewhat "C" pattern, utilized as an opening 24 for accessing the interior of the hollow body 20. And additionally viewed is a telescoping item 44 seen interiorly of the segmented type body illustrated, denoted as numeral 20, which allows for a lengthened snarl preventing device when utilized with coil type cords of greater length than usual (such as provided with desk top units usually having rather short coil cords). Although not shown, the inserted telescoping item 44 or the hollow body 20 can be fitted with a keeper(s) so that the inserted item 44 is not easily removable from body 20.

Figures 5, 6, 7:
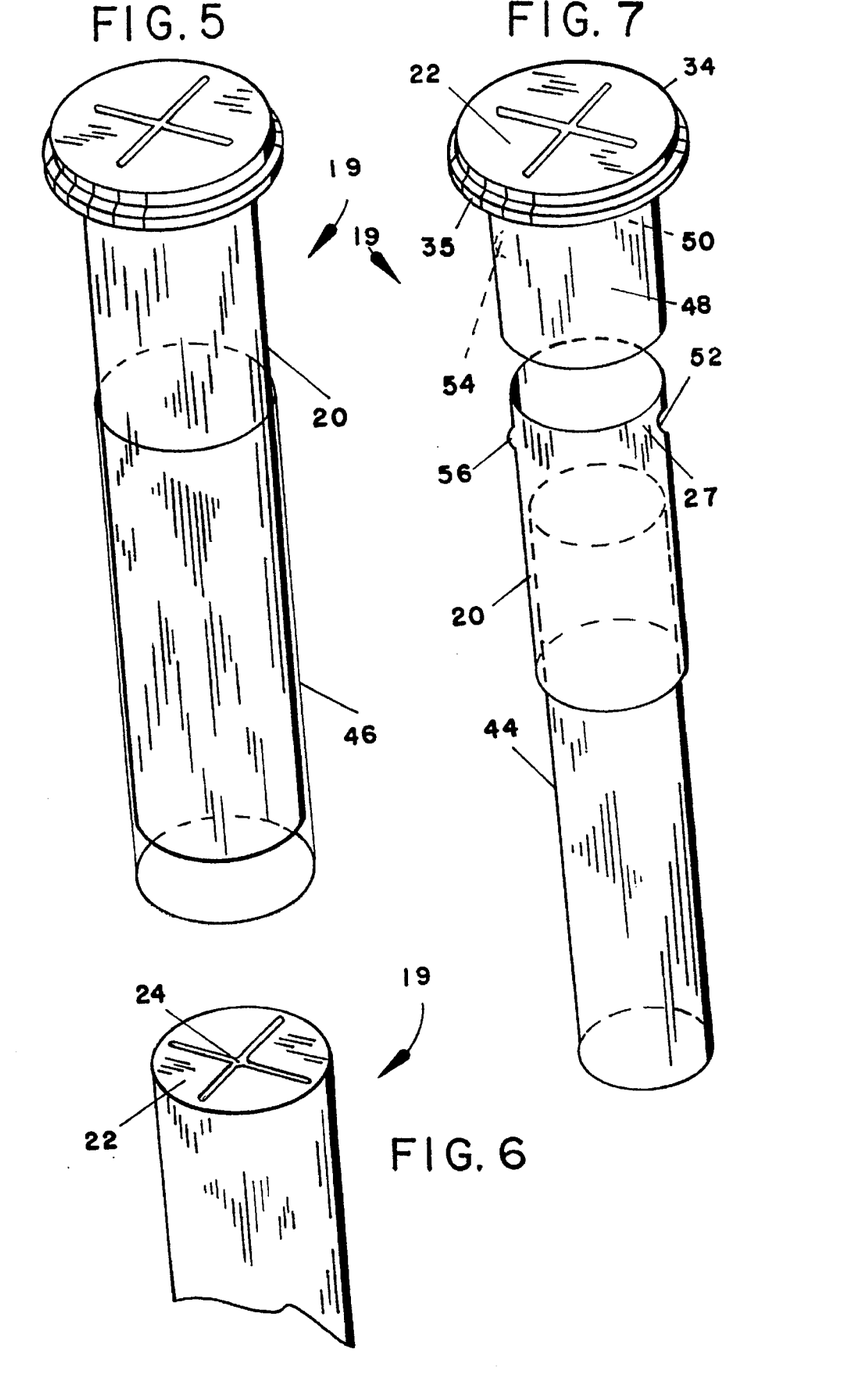
FIG. 5 is a perspective view of the device of the invention illustrating an alternately designed coil cord fastening item having a protruded circular portion with a circumferential rim formed thereon; also, a slip-on transparent tubular item is shown in this view.
FIG. 6 is a fragmentary perspective view of a differently designed snarl preventing device of the invention having a nonremovable coil cord fastening item.
FIG. 7 is a perspective view illustrating the device of the invention having a slip-on type coil cord fastening member utilizing an annular bulge(s) and a corresponding annular groove(s) for connection purposes; also, a telescopic item is shown in this view for utilization when a lengthened body of the snarl preventing device is necessary.

Referring now to FIG. 5, device 19 is shown mostly similar to those viewed in FIG. 1 and FIG. 2 previously. However, a transparent type slip-on tube 46 is shown positioned partially enclosing the hollow body 20. Its purpose being previously discussed regarding a proposed listing type sheet (described following) for placement onto hollow body 20. Or tube 46 could be utilized for printing or inscribing advertising, etc. thereon; however, utilized still for being slid onto tube 46 in the event, possibly, that a plastic material is utilized for body 20 which will not easily receive inscriptions, etc. as one scenario.

Viewing now FIG. 6, device 19 is seen having a variation of the coil cord fastening member 22 as seen in previous drawing figures. It most likely would be the most cost efficient manufactured item possibly utilized with this invention as molding the product would be simplified.

Referring to FIG. 7, device 19 is shown having an entirely removable slip type cap article 48 comprising a cord fastening member 22. Additionally depicted is a circumferential rim 35, formed onto the protruded circular portion 34, for additionally keeping apart, farther, particular sections of a coil cord item which might snarl should they come into contact with each other. Also illustrated is an annular convex protuberance 50 (however, not shown) which could be formed onto a circumferential interior surface of article 48 cooperating with an annular concave groove 52 as seen formed into the exterior upper body portion 27 of hollow body 20. Optionally, an annular concave groove 54 is depicted formed into an interior circumferential surface of article 48, comprising coil cord fastening means 22, which cooperates with a corresponding annular convex protuberance 56 seen formed onto the exterior upper body portion 27 of the hollow body 20. Finally illustrated is a telescoping type item 44 which may be utilized along with the hollow body 20, and as also seen in FIG. 4.

Figure 8:
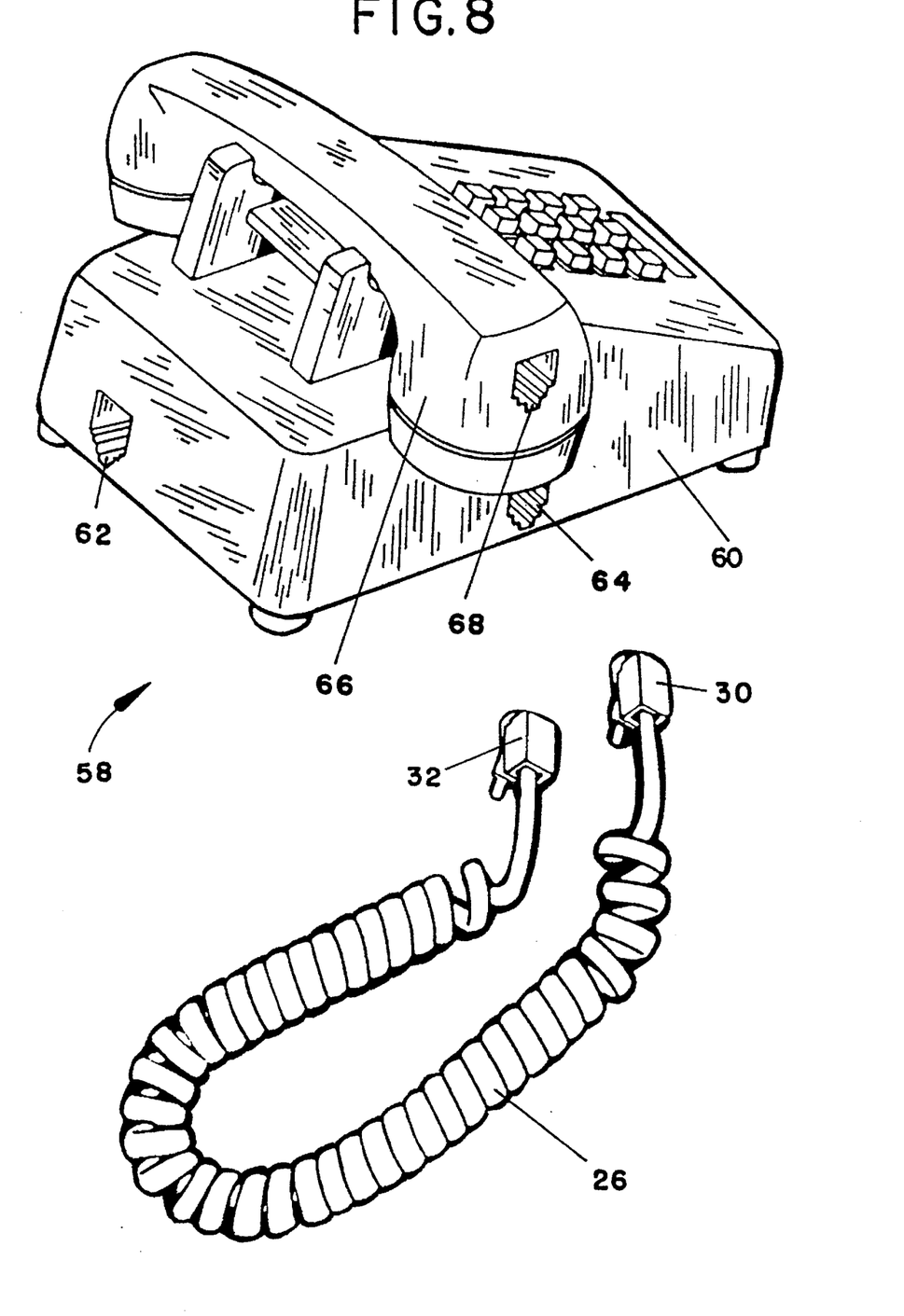
FIG. 8 is a view of one particular, quite common telephone base unit and showing its corresponding retractable handset coil cord item being detached from the base unit.

Referring to FIG. 8, a somewhat commonly designed telephone communications unit 58 is shown comprising a base item 60 having a receptacle or jack 62 for receiving a telephone cord (not shown) plug fitted end. The base 60 is also seen having a jack 64 for receiving a modular connector plug affixed to one end of a telephone handset coil cord 26. Additionally in FIG. 8, a telephone handset item 66 is seen in position resting on the telephone base with the handset seen comprising a jack 68 also for a complementary receiving of a modular plug affixed to an opposite end of the subject handset coil cord 26. And as finally can be seen in FIG. 8, a standard telephone coil cord or commonly referred to as a retractable telephone handset coil cord is depicted having modular plugs affixed thereto, at each end thereof, for a connection with handset and telephone base jacks provided, as described above. For purposes of description and although each connector plug is identical thus interchangable, one of the two plugs will be described as a plug fitted cord first end 30 for a connection with jack 68, and the second of two plug ends will be described as a plug fitted cord second end 32 for a connection with jack 64, as delineated previously.

Figure 9:
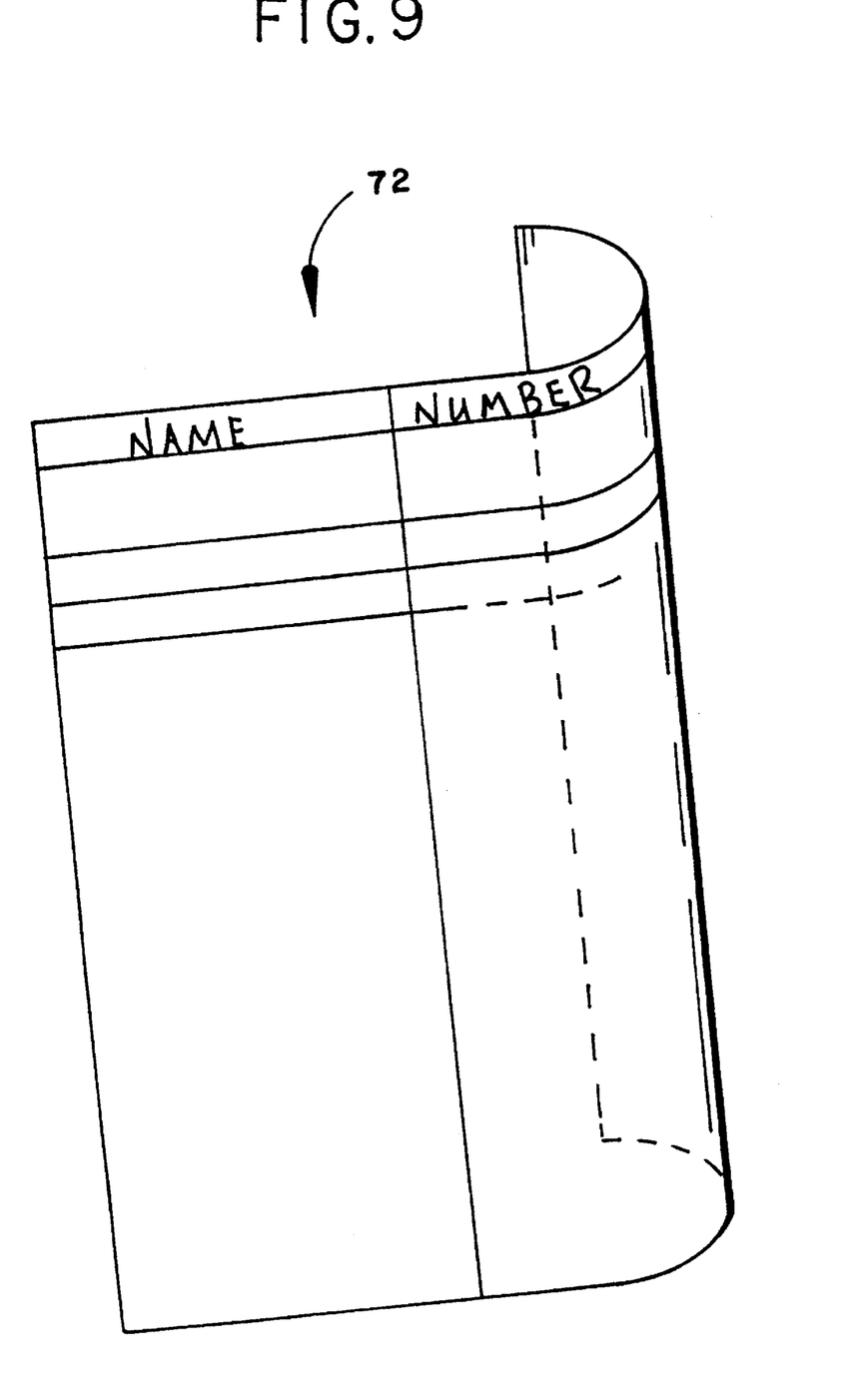
FIG. 9 is a view of a convenient listing sheet for placement onto an exterior surface of the hollow body of the invention.

Viewing finally FIG. 9, a names and telephone numbers' type listing item can be provided with the invention and is denoted as reference numeral 72. As previously described, the listing item would detachably affix to the hollow body 20 (previous drawing figures) exterior of the invention for rapid reference of information included on the list(s).

As working models of the invention have been fabricated and successfully tested and utilized for a considerable period of time, subject models have clearly illustrated the usefulness, versatility and convenience of the current invention. One particular model has been used having a hollow body approximately 8 inches in length entertaining various telephone numbers for rapid reference inscribed thereon, and have proven very useful, including: 1) emergency numbers;

2) churches or pastors' numbers; 3) grocery stores (their pharmacies and deli. numbers); 4) major pizza establishments for deliveries; 5) schools; 6) other business establishments such as mass merchandising concerns and their pharmacies; 7) friends; 8) business associates; 9) and pertinent medical and dental telephone numbers.

And while the previous description of various embodiments contains numerous specificities, these should not be construed as limitations on the cope of the invention, but instead as exemplifications of preferred embodiments thereof. Surely, other variations are possible. For example, it is conceivable that while still functioning as intended for antisnarling purposes, the body of the invention could be fitted with electronic type equipment including, possibly, computer type chips or other high tech components further cooperating with telephone base units which they would complement to increase utilitarian aspects of current or future telephone systems.

However, as heretofore stated, equivalent constructions or fabrications are to be regarded as being included within the claims following insofar as they do not depart fundamentally from the spirit and scope of the invention.

Accordingly and to reiterate the significance of the claims to the present invention, the range of the invention should be determined not by the embodiments illustrated, but by the appended claims and their legal equivalents.

I claim:

1. A snarl preventing device for unrestrictingly surrounding a portion of a telephone coil cord, comprising:
   a hollow member of predetermined length, breadth and material having first and second opened ends;
   one and only one closure article defining coil cord fastening means having an opening, operably joined with one end of said hollow member, for firmly yet slidably receiving a coil cord.

2. The snarl preventing device as recited in claim 1 wherein said coil cord fastening means further comprises telephone coil cord snarl prevention protruding means extending outwardly from an exterior surface of said hollow member explicitly for keeping separated a sufficient distance, exteriorly of said hollow member, random sections of said coil cord to prevent snarling conditions.

3. The snarl preventing device as recited in claim 2 wherein said protruding means further comprises a telephone coil cord snarl preventing circumferential lipped rim formed at the outermost portion thereof, explicitly for separating a farther distance coil cord sections which tend to tangle when coming into contact with each other exteriorly of said hollow member.

4. The snarl preventing device as recited in claim 1 wherein said coil cord fastening means is entirely removable from said hollow member.

5. The snarl preventing device as recited in claim 4 wherein said fastening means further comprises, one of 1) an annular convex protuberance formed onto a circumferential interior surface thereof cooperating with a corresponding annular concave groove formed into said hollow member exterior, or 2) an annular concave groove formed into an interior circumferential surface of said fastening means cooperating with a corresponding annular convex protuberance formed onto said hollow member exterior.

6. The snarl preventing device as recited in claim 1 wherein said hollow member further comprises a telephone coil cord snarl preventing telescopically inserted member arranged interiorly of said hollow member slidably cooperating longitudinally with an inside surface thereof, and separating telephone coil cord portions explicitly for antisnarling purposes when extended out of said hollow member.

7. A method of utilizing a coil cord snarl preventing device in conjunction with a telephone system, comprising the steps of:
   providing a telephone base member having an aperture for receiving a modular plug;
   providing a telephone handset member having a complementary aperture also for receiving a modular plug;
   providing a telephone coil cord having a telephonic modular plug fixedly attached to each of first and second ends of said cord, said coil cord detachably connected with said base and handset members;
   providing a substantially hollow member having opened inlet and outlet ends, whereby constructed so as not to be restrictive or constrictive of the extending and retracting capabilities of said telephone coil cord item;
   providing one and only one telephone coil cord fastening member affixably cooperating with said inlet end of said hollow member, thereby allowing said coil cord item to function in an unrestricted manner interiorly and exteriorly of said hollow member;
   providing an opening in said telephone coil cord fastening member for accessing said hollow member interior;
   detaching said first, plug fitted end of said coil cord from said handset member;
   feeding said first, plug fitted end of said coil cord through said fastening member opening;
   snaking said coil cord first, plug fitted end through the entire interior length of said hollow member thence exiting said hollow member outlet end a suitable distance; and thereafter
   reattaching said first, plug fitted end of said coil cord with said corresponding receiving aperture provided in said telephone handset member.

8. A method of utilizing a coil cord snarl preventing device in conjunction with a telephone system, in accordance with claim 7, further including the step of slidingly adjusting said coil cord snarl preventing device to a favorable location thereon said coil cord thereby bringing said snarl preventing device into a proper relationship with said coil cord for effective snarl preventing purposes.

9. A method of utilizing a coil cord snarl preventing device in conjunction with a telephone system, in accordance with claim 7, wherein said telephone coil cord fastening member further comprises telephone coil cord snarl prevention protruding means, extending outwardly from said hollow member, explicitly for separating coil cord portions which could otherwise come into contact exteriorly of said hollow member resulting in cord snarling.

10. A method of utilizing a coil cord snarl preventing device in conjunction with a telephone system, in accordance with claim 9, further including a telephone coil cord snarl preventing circumferential rim disposed at the outermost portion of said coil cord fastening member protruding means, and formed explicitly for separating farther coil cord sections which tend to snarl when contacting each other, said rim formed at a lower plane than the uppermost planar surface of said coil cord fastening member effecting a lip thereon.

11. In combination:
   a coiled, flexible telephone handset cord having first and second ends utilizing a telephonic communications modular connector plug affixed to each of said ends;

a hollow tubular member of predetermined length and diameter having opened upper and lower ends; and one and only one coil cord fastening member, operably coupled with said tubular member upper end, having an opening defined by at least one slit provided in a flexible, resilient planar surface typically comprising the topmost portion of a closure related cap article, so that said first end of said handset cord may be manually fed through said opening in said fastening member, said cord first end further manually urged entirely through said hollow tubular member exiting said tubular member lower end a manipulated distance, said cord first end then connectable with an aperture provided in a telephone handset for compatibly receiving said modular connector plug, said second end of said handset cord, protruding from said fastening member also a manipulated distance, concurrently connectable with an aperture provided in a wall-mounted, a desk top or a mobile base for compatibly receiving said modular connector plug.

12. The combination of claim 11 wherein said hollow tubular member further comprises a telephone coil cord snarl prevention article slidably operable within said hollow tubular member explicitly for separating coil cord sections when extended out of said hollow tubular member.

13. The combination of claim 11 wherein said coil cord fastening member protrudes outwardly from said hollow tubular member explicitly for preventing coil cord tangling exteriorly thereof, said coil cord fastening member further comprising a low density plastic material with said cord fastening member opening being formed capably in a multiplicity of patterns, said fastening member protruded portion further comprising a telephone coil cord snarl preventing circumferential rim formed at the outermost portion thereof, and also formed at a lower plane than the uppermost planar surface of said coil cord fastening member, explicitly for separating a farther distance particular coil cord sections which would otherwise contact each other resulting then in cord tangling.

14. The combination of claim 11 further comprising listing means for arrangement on an exterior surface of said hollow tubular member, and adapted for an item-by-item list comprising names and telephone numbers of individuals or companies.

15. The combination of claim 14 further including a slip-on tubular member comprising a transparent material so constructed that said slip-on member may be slid over said hollow tubular member listing means thus protectingly enclosing said listing means thereon said hollow tubular member.

16. The combination of claim 15 wherein, one of 1) said hollow tubular member, or 2) said slip-on tubular member further comprises advertising means for promoting a variety of products and services thereon.

* * * * *